: 3,105,055
PROCESS OF PLASTICIZING POLYCHLOROPRENE EMPLOYING ALKALI SULFITE
Charles Elmer Aho, Louisville, Ky., assignor to E. I. du Pont de Nemours and Company, Wilmington, Del., a corporation of Delaware
No Drawing. Filed Apr. 5, 1960, Ser. No. 20,005
2 Claims. (Cl. 260—30.8)

This invention relates to a process for preparing plastic sulfur-modified polychloroprene, and more particularly to a sulfur-modified polychloroprene in which the polychloroprene is plasticized with the aid of a sodium sulfite.

It is known that plastic polychloroprene can be produced by polymerizing chloroprene in the presence of a small amount of dissolved sulfur in an aqueous emulsion using a peroxy compound as the catalyst. The polymer while still dispersed in the water is plasticized by the addition of certain sulfur compounds such as tetraalkyl thiuram disulfides and sodium alkyl dithiocarbamates. The plasticized polymer is then isolated from the latex by any of the usual methods, such as by drum drying, freezing, etc. These plastic polymers under certain conditions which necessarily exist before their isolation, often tend to precoagulate, thereby depositing lumps of the polymer which are troublesome to remove from the equipment and which, if allowed to remain in the polymer, impair its quality. The plasticizing agents presently employed in this process are relatively expensive chemicals, adding materially to the cost of the resulting polymer.

It is therefore an object of the present invention to provide a process for preparing plastic polychloroprene with plasticizing agents which improve the stability of the dispersion (elastomer latex) during the treatment it undergoes prior to isolation of the massive polymer, thereby preventing or reducing the amount of precoagulation which occurs in dispersions produced by the presently known processes. It is a further object of the invention to use less expensive plasticizing agents which can be substituted for part of the more expensive plasticizers presently employed, and which produce more stable polymer latices at less cost.

This invention is particularly directed to the preparation of plastic, sulfur-modified polychloroprene by a process in which the chloroprene is polymerized in an aqueous alkaline emulsion containing a dispersing agent, a small amount of sulfur, and a peroxy compound as the catalyst in an amount sufficient to bring about polymerization at the desired rate. In this process, from 0.3 to 0.6 part of an alkyl thiuram disulfide per 100 parts of polychloroprene is usually added to the resulting polychloroprene emulsion prior to its coagulation. This operates as a plasticizing agent, and, in those cases where it is desired to stop the polymerization prior to completion, it serves as a short-stopping agent. In addition to the alkyl thiuram disulfide, there may be added up to 0.65 part of an alkyl dithiocarbamate per 100 parts of the polychloroprene to give the degree of plasticity desired.

The present invention resides in the addition to the polychloroprene emulsion of an alkali sulfite as a plasticizing agent and as a stabilizer for the aqueous dispersion. This is in addition to the alkyl thiuram disulfide and may be in addition to or as a substitute for all or part of the alkyl dithiocarbamate employed. By the use of the alkali sulfite, the amount of thiuram disulfide employed can be reduced and the amount of the alkyl dithiocarbamate can be greatly reduced or eliminated entirely. Ordinarily, from 0.1 to 0.8 part of alkali sulfite per 100 parts of polychloroprene will give the degree of plasticity desired. The substitution of the alkali sulfite material reduces the cost of the total plasticizing agent employed.

The present invention is applicable to the preparation of plastic polychloroprene elastomers which may be 100% polychloroprene or elastomers prepared from chloroprene with minor amounts (less than 50%) of another ethylenically unsaturated copolymerizable compound such as styrene, methyl methacrylate, butadiene, and 2,3-dichlorobutadiene. The term "polychloroprene" as used in this specification includes such copolymers.

The emulsifying agents used in carrying out the polymerization process may be any of those normally employed in the emulsion polymerization of chloroprene, such as the alkali salts (sodium, potassium, ammonium, etc.) of long chain or polynuclear carboxylic acids such as oleic, stearic, abietic, and those made from hydrogenation or disproportionation of rosin acids. Ordinarily, the presence of at least some acid-stable dispersing agents is preferable and is necessary where the dispersion is acidified as part of the coagulation process. Such acid-stable dispersing agents are exemplified by the water soluble salts of sulfonic acids of long hydrocarbon chains, or of polycyclic systems, or water soluble salts of sulfuric acid esters of long chain alcohols.

The amount of sulfur used is the same as that previously employed in the polymerization of chloroprene and will ordinarily be from 0.25% to 2.0% of the monomer to be polymerized, depending upon the plasticity desired.

Any of the organic or inorganic peroxy compounds such as benzoyl peroxide, perbenzoic acid, sodium persulfate, dicumyl peroxide, etc., may be employed in effecting the polymerization.

The alkyl-substituted thiuram disulfides or the water soluble alkyl-substituted dithiocarbamates, or both, are employed as plasticizing agents together with the alkali sulfite of the present invention. The amount of the thiuram disulfides and the dithiocarbamates, however, may be greatly reduced; in fact, it has been found that only half the quantity of the dithiocarbamate need be employed when the alkali sulfite is used as an additional plasticizing agent. The tetra-substituted thiuram disulfides and the water soluble disubstituted dithiocarbamates may be any of those in which the alkyl substituents on the nitrogen atom are open chain alkyl groups or alkylene groups in which both ends are attached to the nitrogen, such as dipentamethylene thiuram disulfide, dihexamethylene thiuram disulfide, tetramethyl-, tetraethyl-, tetrabutyl- and tetraoctyl thiuram disulfides and the corresponding di-substituted dithiocarbamates. These compounds are added as solutions or aqueous dispersions, preferably of their solutions in hydrocarbon solvents.

The alkali sulfite, which may be the sodium, potassium or ammonium sulfite or bisulfites, of the present invention are added preferably as 2% to 8% aqueous solutions. To prevent any possibility of coagulation of the latex on the addition of these solutions of the sulfite, the solution may contain the dispersing agent of the type normally used in polymerization, such as described above.

After the addition of the sodium sulfite and other plasticizing agents such as the thiuram disulfides or the disubstituted dithiocarbamates, the polymer dispersion is allowed to stand until the desired degree of plasticization is obtained. This usually requires from 2 to 8 hours at 25° to 30° C. Too long aging after the maximum plasticization is reached will cause a definite decrease in the plasticity of the polymer.

The aging of the elastomer latex containing the plasticizing agent may be carried out at any temperature between 10° and 50° C. While the effect of the sulfite on both stability and plasticity increases as additional quantities are used, practical difficulties such as excessive dilution when it is added as a more dilute solution, or coagulation if added as a more concentrated solution, become important. Although the sulfites have a positive effect upon the stability of the polymer dispersions when added at any stage of the polymerization, they tend to retard the plasticizing of the polymers when they are added prior to polymerization. To obtain the plasticizing action according to the present invention, the sulfites should be added after completion of the polymerization.

The following examples are given to illustrate the invention. The parts used are by weight.

EXAMPLE 1

A polymer dispersion is made by emulsifying 100 parts by weight of chloroprene, containing in solution 0.6 part of sulfur and 4.0 parts of wood rosin, in a water solution containing 122.5 parts of water, 0.75 part of sodium hydroxide and 0.5 part of the sodium salts of the condensation product of naphthalene sulfonic acids with formaldehyde, serving as the acid-stable dispersing agent. The sodium hydroxide in one phase reacts with the rosin in the other, forming sodium salts of the rosin which act as the main emulsifying agent. The emulsified chloroprene is then polymerized at 40° C. by adding as catalyst, a solution of 0.50 part of potassium persulfate and 0.025 part of the sodium salt of anthraquinone beta-sulfonic acid in 9.47 parts of water. Part of this is added at the start and part during the course of the polymerization, to maintain a fairly uniform rate of polymerization. The course of the polymerization is followed by determining the specific gravity of the dispersion. When this reaches 1.072 at 40° C., corresponding to 90% conversion to polymer, the reaction is "short stopped" by adding 0.45 part of tetraethyl thiuram disulfide dissolved in 2.95 parts of toluene dispersed in 2.22 parts of water by means of 0.30 part of the sodium salts of long chain sodium alkyl sulfates and 0.06 part of the sodium salts of the condensation product of naphthalene sulfonic acids with formaldehyde.

To this polymer dispersion is added 0.35 part of sodium sulfite dissolved in 6.58 parts of water containing 0.07 part of the sodium salts of long chain alkyl sulfates to act as a dispersing agent in preventing any coagulation on mixing with the polymer dispersion. There is also added at this point 0.19 part of the sodium dibutyl dithiocarbamate in 0.61 part of water. After cooling to 25° C. aging for 4 hours at that temperature, the dispersion is stripped with steam at reduced pressure in a turbannular flow tube, as described in U.S. Patent 2,467,679, to remove unpolymerized chloroprene and other volatile components and then acidified with dilute acetic acid to pH 5.6.

The acidified dispersion is then coagulated by freezing in thin layers as described in U.S. Patent 2,187,146, and the resulting sheets of polymer are washed and dried.

The polychloroprene made as above is light-colored and odorless, and has the following properties prior to and after compounding in the usual manner.

*Uncompounded Polymer*

Mooney viscosity (ML 100° C., 2.5 min.):
    Original ------------------------------------ 51
    Aged 5 days at 50° C. ---------------------- 51
    Aged 10 days at 50° C. --------------------- 45
    Aged 20 days at 50° C. --------------------- 38
Nerve number (see U.S.P. 2,914,497) --------- 3.2
Williams plasticity recovery numbers:
    Original ------------------------------------ 116–41
    After milling 2 min. ----------------------- 103–22
    After milling 4 min. ----------------------- 94–12
    After milling 8 min. ----------------------- 88–5
    After milling 16 min. ---------------------- 83–2
    After milling 32 min. ---------------------- 73–1

*Compounded Polymer*

When compounded using the following formula:
    100.0 parts of polymer
    0.5 part of stearic acid
    4 parts of magnesium oxide
    5 parts of zinc oxide and cured for 10 minutes at 307° F., it exhibited the following properties.

Stress-strain properties:
    600% modulus, p.s.i. ---------------------- 1050
    800% modulus, p.s.i. ---------------------- 2700
    Tensile strength, p.s.i. ------------------- 3650
    Percent elongation at break --------------- 920

In all of these properties, the product prepared according to the above example had substantially identical values throughout as the product prepared in identical fashion except that 0.37 part of sodium dibutyl dithiocarbamate was used instead of 0.19 part, and no sodium sulfite was employed.

To test the stability of the polymer dispersion containing sodium sulfite as prepared in Example 1, four 300 gram samples of the acidified dispersion are shaken vigorously in bottles for 10 minutes and the polymer precipitated is weighed. The average of four determinations is 7.6 grams. The average of four determinations with a control dispersion containing no sodium sulfite but otherwise the same as in Example 1, is 13.8 grams, thus showing the much greater stability of the dispersion made with sodium sulfite.

EXAMPLE 2

The process of Example 1 is carried out with the elimination of the sodium dibutyl dithiocarbamate and an increase of the tetraethyl thiuram disulfide to 0.60 part. A polymer of the same viscosity and same general properties is obtained.

As indicated in Example 2, similar savings are made, without changing properties of the product, by completely eliminating the sodium dibutyl dithiocarbamate, using the same amount of sodium sulfite and increasing the amount of the tetraethyl thiuram disulfide to only 0.60 part.

I claim:

1. In the process for preparing plastic sulfur-modified polychloroprene in which the chloroprene is polymerized in an aqueous alkaline emulsion containing a dispersing agent, a small amount of sulfur and a peroxy compound as the catalyst and to which an alkyl thiuram disulfide is added in the dispersion of the polychloroprene, the improvement which comprises incorporating in the aqueous dispersion of the polymer, after polymerization has been brought to the stage of completion desired but prior to coagulation of the polymer, from 0.1 part to 0.8 part of an alkali sulfite per 100 parts of polychloroprene in the dispersion, then coagulating, washing the coagulated polymer with water, and drying.

2. In the process for preparing plastic sulfur-modified polychloroprene in which the chloroprene is polymerized in an aqueous alkaline emulsion containing a dispersing agent, a small amount of sulfur and a peroxy compound as the catalyst and in which an alkyl thiuram disulfide and an alkyl dithiocarbamate are added to the dispersion of the polychloroprene, the improvement which comprises incorporating in the aqueous dispersion of the polymer, after polymerization has been brought to the stage of completion desired but prior to coagulation of the polymer, from 0.1 part to 0.8 part of an alkali sulfite per 100 parts of polychloroprene in the dispersion then coagulating, washing the coagulated polymer with water, and drying.

References Cited in the file of this patent

UNITED STATES PATENTS 2,234,215    Youker ------------------ Mar. 11, 1941

OTHER REFERENCES

"Handbook of Chemistry and Physics," 38th edition, Chemical Rubber Publishing Company, Cleveland, Ohio, 1956, pages 1621 and 1645.